INVENTOR
JAMES B. MACKAY

BY John E. Dougherty Jr
ATTORNEY

United States Patent Office
3,065,359
Patented Nov. 20, 1962

3,065,359
SUPERCONDUCTOR PULSING CIRCUIT

James B. Mackay, Poughkeepsie, N.Y., assignor to International Business Machines Corporation, New York, N.Y., a corporation of New York Filed Dec. 3, 1958, Ser. No. 777,916
16 Claims. (Cl. 307—88.5)

The present invention relates to superconductor circuits and, more particularly, to superconductor circuits for producing one or more pulses of predetermined characteristics in response to an applied pulse having different characteristics.

The large majority of the superconductor circuits which have been heretofore developed have been D.C. type circuits using cryotron type devices. By this it is meant that such circuits are designed to respond to D.C. currents established in a particular current path by allowing that path to remain superconductive while one or more paths in parallel therewith across a current supply source are driven resistive. In these circuits the transient currents which are produced in two or more parallel paths when an input pulse is initially applied have been to a large degree ignored, though, of course, the circuits are designed so that these transients do not interfere with the D.C. circuit operation. Though these D.C. type circuits do have many advantages, problems do arise in designing such circuits where circuit operation is sensitive to the duration of applied input pulses both in the sense that input pulses having too little or too great a duration either produces faulty circuit response or the longer pulses cause a larger amount of heat to be generated than is actually necessary for proper circuit operation.

In accordance with the principles of the subject invention, transient currents are advantageously employed to provide a pulsing circuit, which may be termed a differentiating circuit, and which is capable of producing output pulses of predetermined characteristics in response to both the leading and trailing edges of a signal applied to the circuit. The circuit includes first and second paths connected in parallel with a pulse input terminal. The inductances of the two paths are such that, when an input pulse is applied, a substantial current is initially established in the first path. This current is only transient since a finite resistance is provided in the first path which causes the current therein to be shifted to the second path which is maintained entirely superconductive. When the input pulse is terminated a second transient current pulse is produced in the first path, with this second pulse being in a direction opposite to that of the transient pulse produced in response to the leading edge of the input pulse. One or the other or both of these pulses produced in this first path by the leading and trailing edges of the input pulse may be utilized to control a superconductor gating device between superconductive and resistive states by connecting the control conductor for the gating device in the first path. Bias means may be provided, either in the form of a separate bias conductor for the gate conductor or in the form of means for producing a bias current in the control conductor connected in the first path, to render the gate conductor responsive to a particular one only of the transient pulses produced therein when an input pulse is applied to the circuit. Since the duration of the transient pulses thus produced is independent of the duration of the applied pulse, the circuit may be utilized, as is illustrated in one embodiment disclosed herein by way of illustration, to apply pulses of predetermined duration to a circuit which is sensitive to the duration of input pulses applied thereto. In accordance with another embodiment, the novel pulsing circuit is employed to apply heating pulses to a heat controlled superconductor circuit, with the design being such that only the heat necessary for the desired circuit operation is produced in response to the applied input pulses.

Accordingly, it is an object of the present invention to provide a superconductor pulse producing circuit.

Another object is to provide a superconductor differentiating circuit.

Still another object is to produce a superconductor circuit for producing pulses of predetermined characteristics in response to applied pulses having different characteristics.

A further object is to provide a superconductor circuit for producing individual pulses in response to one or the other or both the leading and trailing edges of applied pulses, and more specifically, for producing such pulses having a predetermined duration regardless of the duration of the applied pulses.

Another object is to provide a superconductor circuit for providing pulses of predetermined duration.

Still another object is to provide a superconductor circuit wherein a superconductor gate conductor is controlled between superconductive and resistive states by transient currents produced in the control conductor for the gate conductor.

A further object is to provide an improved superconductor heat driven circuit.

These and other objects of the invention will be pointed out in the following description and claims and illustrated in the accompanying drawings, which disclose, by way of examples, the principle of the invention and the best mode, which has been contemplated, of applying that principle.

Figure 1:
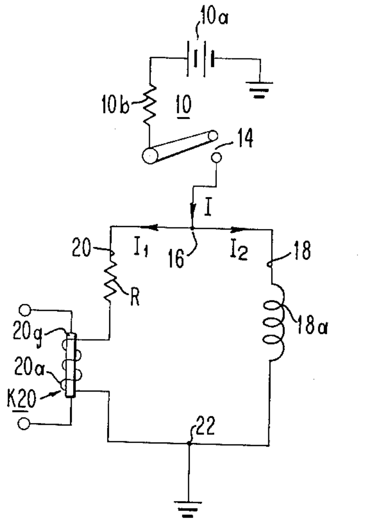
FIG. 1 is a schematic representation of one embodiment of a superconductor pulsing circuit constructed in accordance with the principles of the invention.

Current is supplied to the differentiating circuit of FIG. 1 by a constant current source 10, represented by a battery 10*a* and resistor 10*b*, under control of a switching device, here illustratively represented as switch 14. Source 10 under control of switch 14 supplies current pulses I to a terminal 16 from which two parallel paths 18 and 20 extend to a ground terminal 22. Path 18 includes an inductance 18*a* and this entire path including this inductance is fabricated of a superconductor material which, at the operating temperature of the circuit, is capable of carrying the entire current I supplied by source 10 without being driven resistive. For a circuit which is to be operated at 4.2° K., the temperature at which liquid helium boils at atmospheric pressure, the entire path 18 might, for example, be fabricated of either lead or niobium both of which are relatively "hard" superconductors at this operating temperature. By the term "hard" it is meant that these materials require a magnetic field of relatively high intensity to cause them to be driven resistive at a particular temperature. The other path 20 also includes an inductance 20*a*, which is the control conductor for a cryotron K20 having a gate 20*g*. Path 20 also includes a resistor designated R which is resistive at the operating temperature of the circuit. The entire path 20, with the exception of resistor R, is fabricated of a hard superconductor material which may be the same material as is used in path 18. The resistor R may be fabricated of a non superconductor material such as copper, or may be a material which only becomes superconductive at a temperature below the operating temperature of the circuit. For example, for a circuit which is operated at 4.2° K. the resistor R may be fabricated of tin which is a superconductor having a transition temperature of about 3.72° K.

Figure 1A:
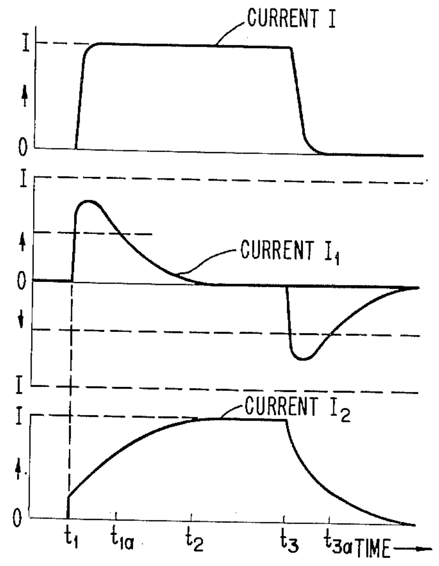
FIG. 1A shows wave forms produced in various conductors of the circuit of FIG. 1 when this circuit is operated.

The coils 18*a* and 20*a* and the paths 18 and 20 are designed so that path 20 has a much lower inductance than path 18. As a result, when switch 14 is operated to apply a current pulse at terminal 16, the larger portion of this current is initially directed through the path 20 even though this path contains resistance and path 18 is entirely superconductive. This current distribution is depicted in FIG. 1A which shows the manner in which the current I applied at terminal 16 divides with a current $I_1$ in path 20 and a current $I_2$ in path 18 when switch 14 is closed at a time $t_1$ and then opened at a time $t_3$. As there shown, the current $I_1$ in path 20 rises almost instantaneously to a maximum of about 0.8I at time $t_1$ and then this current shifts at a relatively slow rate to path 18. The rate at which this current shifts is dependent on the time constant of the circuit, that is $L_1+L_2/R_1$ where $L_1$ is the inductance of path 20, $L_2$ is the inductance of the path 18, and $R_1$ is the resistance value of resistor R. This current shift, is due to the fact that, when the pulse is first applied, the current divides between paths 18 and 20 inversely in proportion to the inductance of these paths and, thereafter, the current shifts so that a steady or D.C. state is obtained wherein the current divides between the paths inversely in proportion to the resistance of the paths. Thus, at time $t_2$, the entire current I is in path 18 and there is no current in path 20. When at time $t_3$ the input pulse applied at terminal 16 is terminated, the current I rapidly falls to zero. However, due to the presence of the inductance in paths 18 and 20 and the fact that the current I is not, at time $t_3$, divided between the paths inversely in proportion to the inductances of the paths, a transient current pulse is set up around the loop formed by paths 18 and 20. This transient produces in path 20 another pulse similar to that initially produced at time $t_1$ but in the opposite direction.

The gate 20*g* of cryotron K20 is fabricated of a soft superconductor material, that is a material which at the operating temperature of the circuit is superconductive, but which requires a magnetic field of relatively low intensity to drive it resistive. For a circuit which is operated at 4.2° K., the gate conductor 20*g* might be fabricated of tantalum which has a transition of about 4.4° K. and which can be driven resistive when at a temperature of 4.2° K. by fields having an intensity less than 100 oersteds. The field which is required to drive a superconductor, such as gate 20*g*, from a superconductive to a resistive state at a particular temperature is termed the critical field for the superconductor at that temperature. If, the control conductor of cryotron K20, that is coil 20*a*, is effective to apply a field in excess of its critical field to gate conductor 20 when the coil is carrying a current less than 0.8I, it is apparent that gate 20*g* is driven resistive both by the leading and trailing edges of the pulse applied at terminal 16. Thus, if a current equal to 0.5I is sufficient in coil 20*a* to produce a field in excess of the critical field for gate 20*g*, this gate will be held resistive by the fields produced by current $I_1$ in coil 20*a* from time $t_1$ to time $t_{1a}$ and from time $t_3$ to time $t_{3a}$. During the time from time $t_{1a}$ to time $t_3$ the field applied by coil 20*a* to gate 20*g* is insufficient to hold this gate resistive, and, except for the time after time $t_{1a}$ required to allow the gate to cool in the event it has been heated appreciably during the operation, the gate is in a superconductive state.

Figure 2:
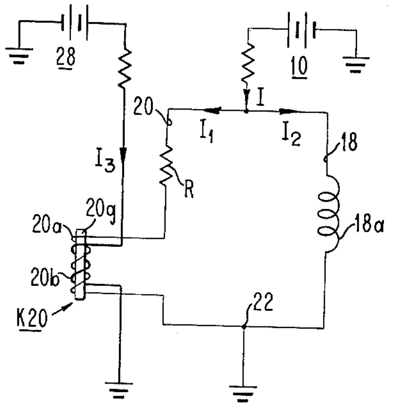
FIGS. 2 and 3 are diagrammatic representations of further embodiments of pulsing circuits constructed in accordance with the principles of the invention.
Figure 3:
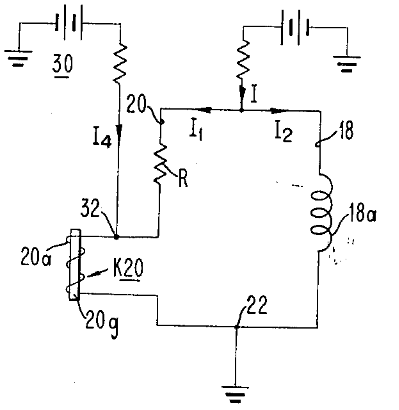

Thus, it can be seen that the gate 20*g* is subjected to a field in excess of its critical field for a predetermined time only when a pulse is initially applied at terminal 16 and is again subjected to a like field when the applied pulse is terminated. The applied pulse should have a minimum duration from $t_1$ to $t_{1a}$ but there are no limitations as to maximum duration. The circuit can be designed so that the gate 20*g* is driven resistive either only by the leading edge of the applied pulse or only by the trailing edge of the applied pulse by applying a biasing field of proper intensity and direction to the gate. FIGS. 2 and 3 show different embodiments illustrating this mode of operation.

In the embodiment of FIG. 2, the biasing field is continuously applied by a coil 20*b* which is wound around gate 20*g* so that the fields produced by this coil are superimposed on those produced by coil 20*a* which carries current $I_1$. Coil 20*b* receives a current $I_3$ from a source 28. This current is sufficient to render the coil effective to apply to gate 20*g* a bias field which, in intensity, is equal to half the critical field for the gate. This bias field is in a direction to add to the field produced by current $I_1$ in the coil 20*a* when an input is applied at terminal 16 and to subtract from the field produced by current $I_1$ in coil 20*a* when the input applied at terminal 16 is terminated. The gate 20*g* is thus driven resistive only when the current pulse is applied and remains resistive for a somewhat longer time than in the embodiment of FIG. 1 since, due to the presence of the bias field, a current of 0.25I in the proper direction in coil 20*a* is sufficient to hold gate 20*g* resistive. By changing the direction of the bias current the circuit can be made so that gate 20*g* is responsive to only the trailing edge of an input pulse, and by varying the magnitude, in either direction, the time during which the gate is subjected to a field in excess of its critical field can be controlled.

The biasing field is produced in the circuit of FIG. 3 by applying a current $I_4$ supplied by a source 30 directly to coil 20*g* so that this current combines in the coil with the current $I_1$. The source 30 is connected to a terminal 32 in path 20 and this terminal is located between resistor R and coil 20*a*. Therefore, the D.C. current from source 30 flows entirely in the superconductive path through coil 20*a* to ground terminal 22 and none of this current is directed through resistor R and to terminal 22 through path 18. By using this type of a connection, the necessity of providing two control conductors for gate 20*g* is obviated and the circuit operation remains the same, that is, the bias current may be varied in direction and magnitude to render the gate responsive to either the leading edge or trailing edge of an applied pulse, or to both, and to control the length of time during which the gate is held resistive by the field produced by the combined currents $I_1$ and $I_4$ in coil 20*a*.

Figure 4:
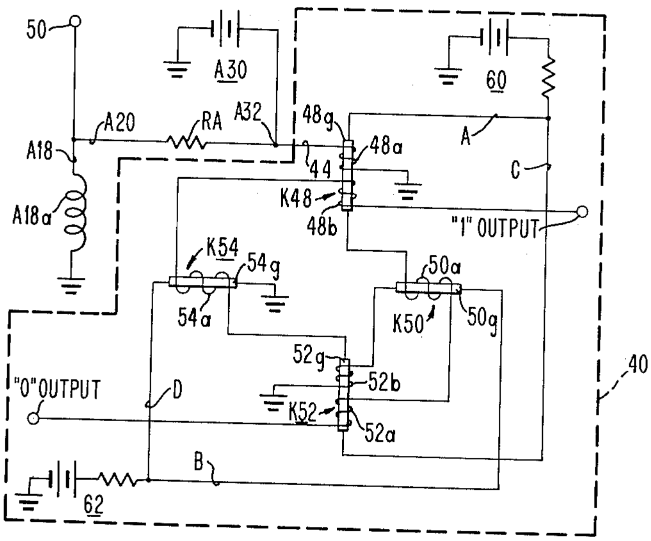
FIG. 4 shows a multivibrator circuit to which inputs are applied by the novel pulsing circuit.

The embodiment of FIG. 4 illustrates how circuits constructed in accordance with the principles of the subject invention may be advantageously employed as input circuits for applying pulses to circuits which are sensitive to the width or duration of applied inputs. The circuit is a monostable or single shot multivibrator and that portion of the circuit of FIG. 4 which is enclosed within the dotted irregular block 40 corresponds to a multivibrator which is shown and described in copending application, Serial No. 703,445, filed December 17, 1957, in behalf of the inventor of the subject invention and assigned to the assignee of the subject application. The multivibrator circuit shown within the block 40 is sensitive to the width of the pulses which are applied via an input line 44 to a control coil 48*a* which is wound around a gate 48*g*, of a cryotron K48. In the embodiment of FIG. 4, the inputs are not applied directly to line 44 but to an input termial 50. Connected in parallel with this terminal are a first path A18, which includes an inductance A18*a*, and a path A20, which includes a resistor RA, a terminal A32 and control coil 48*a*. These paths correspond to the paths 18 and 20 of FIGS. 1, 2, and 3 with the former path being entirely superconductive, and the latter being superconductive except for the resistor RA. A bias current source A30 is connected to terminal A32 and applies thereat a bias current which is directed through coil 48*a*. This current is in the same direction as the current produced in this coil when an input is initially applied at input terminal 50, but is of itself of insufficient magnitude to drive gate 48 resistive. Therefore, the input circuit here utilized corresponds to that shown in FIG. 3 with the bias being such that the gate 48*g* is responsive only to the leading edge of the input pulses applied at terminal 50.

The monostable multivibrator itself consists of two circuits, one of which receives current from a source 60 and the other of which receives current from a source 62. The first of these circuits includes two parallel current paths A and C. Path A is a "0" output path and includes the gate 48*g* of cryotron K48, a coil K50*a* of a cryotron K50, a coil 52*a* of a cryotron K52 and a "0" output terminal. Path C is a "1" output path and includes a gate 52*g* of cryotron K52, a coil 54*a* of a cryotron K54, a coil 48*b* of cryotron K48 and a "1" output terminal. The other circuit which receives its output from source 62 likewise includes two parallel paths which are designated B and D. Path D includes only a gate 54*g* of cryotron K54, and path B includes a gate 50*g* of cryotron K50 and a coil 52*b* of cryotron K52.

Figure 4A:
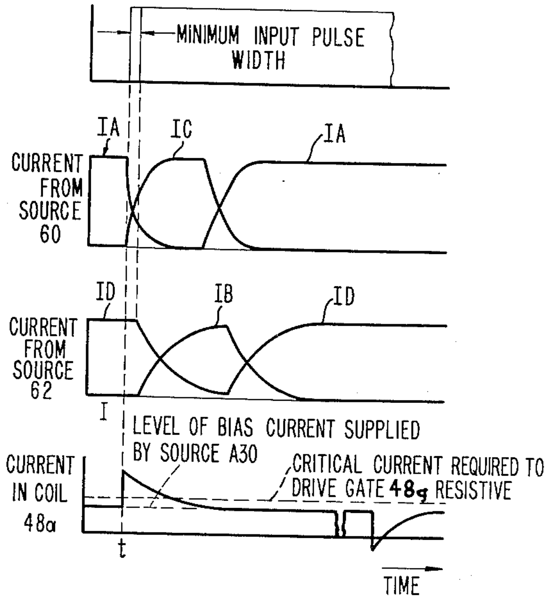
FIG. 4A shows a series of wave forms which illustrate the operation of the multivibrator of FIG. 4.

When the monostable multivibrator is in its reset or stable state, the entire current from source 60 is directed through path A to the "0" output terminal and the entire current from source 62 through path D. The current in path A passes through coil 50*a* to hold gate 50*g* in path B resistive and through coil 52*a* to hold gate 52*g* in path C resistive so that the circuit maintains itself stable in this state. The operation, when an input is applied at terminal 50, is depicted graphically in the wave-form diagrams of FIG. 4A. As shown in these diagrams the control coil 48*a* is initially carrying only the bias current supplied by source A30. When an input pulse is applied at terminal 50 the majority of the applied current is initially directed through low inductance path A20 to coil 48*a* to drive the gate 48*g* resistive. This gate is held resistive by the combined bias and transient currents for a time sufficient to shift enough current from path A to path C to render coil 54*a* effective to drive gate 54*g* resistive and coil 48*b* effective to drive gate 48*g* resistive. Thereafter, the resistor RA in path A20 causes the current applied at terminal 50 to be shifted through path A18 to ground. With the above current shifting accomplished in the multivibrator, the current from source 60 continues to shift from path A to path C, and the current from source 62 begins to shift from path D to path B. The circuits are designed to have different time constants so that the current shifts from path A to path C and a "1" output is realized before sufficient current is shifted from path D to path B to render coil 52*b* effective to drive gate 52*g* resistive and thereby initiate the shifting of the current back from path C to path A and subsequently from path B to path D, so that the circuit again assumes its initial stable state.

When the input pulse applied at terminal 50 is terminated, the bias current in coil 48*a* is sufficient to prevent the transient current pulse in that coil from driving gate 48*g* resistive. The multivibrator therefore remains in its stable state until another pulse is applied at terminal 50. Due to the addition of the novel input circuit the input pulse applied at terminal 50 need not be controlled as to its maximum duration since regardless of how long the applied pulse is maintained, it is only the initial transient produced by its leading edge which is effective to drive gate 48*g* resistive and initiate the one shot multivibrator action.

Figure 5:
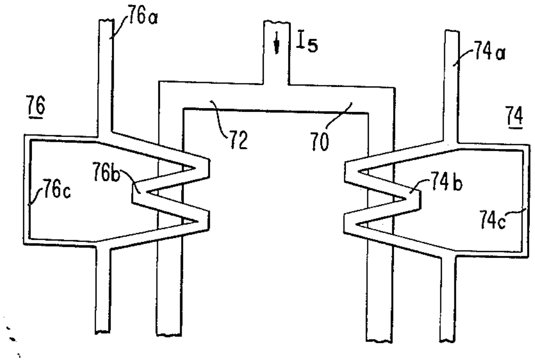
FIG. 5 is a schematic showing of a heat driven superconductor circuit wherein the novel pulsing circuit is used to apply inputs.

The embodiment of FIG. 5 illustrates the manner in which the principles of the invention may be employed advantageously in heat controlled superconductor circuits. In such circuits, heat rather than a magnetic field is applied to a portion of a superconductor path to introduce resistance into that path and cause any current in the path to be shifted from that path into a parallel connected superconductor path. In the circuit of FIG. 5 a current $I_5$ is directed either through a path 70 or a path 72 and the current is switched back and forth between these paths under the control of input circuits generally designated 74 and 76 which receive input pulses on leads 74*a* and 76*a*, respectively. Each of these input circuits includes one low inductance parallel path in the form of a resistive heating element 74*b*, 76*b*, and a second parallel path of higher inductance 74*c*, 76*c*. When an input is applied to either lead 74*a* or 76*a*, a transient current is introduced in the associated heating element 74*b* or 76*b*, to heat path 70 or 72 sufficiently to cause the current $I_5$ to be shifted out of that path and into the other path. The inductances of the parallel paths and the time constants of the input circuits are designed so that, when an input pulse is applied, the transient current pulses through the heating element 74*b* or 76*b*, as the case may be, are just sufficient to heat the associated path enough to cause the desired current shift. As a result of this arrangement there is no heat generated except that which is necessary to accomplish the desired current shifting regardless of the duration of the input pulse.

It should be noted that the embodiments of the invention need not be constructed with a separate resistor element in the inductance path. For example, in the circuits of FIGS. 1, 2, 3, and 4, the resistive element R might be eliminated and the control coil 20*a* fabricated of a material which exhibits finite resistances at the operating temperature of the circuit. Alternately, an added control on the circuit may be provided by inserting the resistance in the form of a cryotron gate which is normally superconductive but which is driven resistive under the control of a signal applied to an associated control conductor. When this type of construction is employed, the original current distribution in accordance with the inductances of the parallel paths will continue unless and/or until the gate conductor in the low inductance path is driven resistive.

While there have been shown and described and pointed out the fundamental novel features of the invention as applied to a preferred embodiment, it will be understood that various omissions and substitutions and changes in the form and details of the devices illustrated and in its operation may be made by those skilled in the art without departing from the spirit of the invention. It is the intention, therefore, to be limited only as indicated by the scope of the following claims.

What is claimed is:

1. A superconductor circuit comprising a pulse input terminal; means for applying current pulses at said input terminal; first and second paths extending in parallel circuit relationship from said input terminal; means maintaining said circuit at a superconductive temperature; said second path being inductive and entirely superconductive at said temperature; said first path including at least a portion which is resistive at said temperature; wherby, when a current pulse is applied at said input terminal current peaks corresponding to the leading and trailing edges of the applied pulse are produced in said first path; and a superconductor gate conductor of a material capable of undergoing transitions between superconductive and resistive states at said temperature disposed adjacent said first path and responsive to at least one of said current peaks produced in said first path to undergo a transition between said states.

2. In a superconductor circuit maintained at a superconductive temperature; a pulse input terminal; first and second current paths extending in parallel circuit relationship from said input terminal; a gate conductor of a material which is superconductive at said temperature; said first path including a control conductor arranged adjacent said gate conductor for controlling said gate conductor between superconductive and resistive states in response to current in said first path; said second path being entirely superconductive at said temperature; and said first path including at least a portion which is resistive at said temperature; and means for applying a current pulse at said input terminal; the inductance of said first path being less than that of said second path so that when said current pulse is initially applied a major portion thereof is directed through said first path to render said control conductor effective to drive said gate conductor resistive; said resistive portion of said first path being thereafter effective to shift said current initially directed through said first path to said second path.

3. In a superconductor circuit, a current input terminal, first and second paths extending in parallel circuit relationship from said current input terminal; a superconductor gate conductor; said first path including a resistive portion and a superconductor control conductor for said gate conductor; means maintaining said paths and said gate conductor at a superconductive operating temperature; said second path being inductive completely superconductive at said operating temperature; said gate conductor being capable of undergoing transitions between superconductive and resistive states at said operating temperature; a first portion of said first path including said control conductor being superconductive at said operating temperature; bias current supply means connected to a terminal in said first path for supplying bias current in a particular direction through said control conductor; and means for applying at said current input terminal a pulse effective to produce in response to its leading and trailing edges, respectively, first and second current pulses in opposite directions in said first path including said control conductor.

4. In a superconductor circuit maintained at a superconductive operating temperature; a current input terminal; first and second current paths extending in parallel circuit relationship from said current input terminal; a superconductor gate conductor capable of undergoing transitions between superconductive and resistive states at said operating temperature disposed adjacent said first path and means for applying a current input pulse at said input terminal; the inductance of said first and second paths being such that said current input pulse initially divides between said paths with sufficient current in said first path and the control conductor therein to cause said gate conductor to undergo a transition between said states; said first path including means in said first path for presenting resistance to said current therein and thereby causing said current initially in said first path to shift to said second path before said current input pulse is terminated.

5. The circuit of claim 4 wherein said resistance means is additionally a resistive element for applying heat to said control conductor in response to current therethrough.

6. The circuit of claim 4 further including bias means comprising a control conductor arranged in magnetic field applying relationship to said gate conductor.

7. An input circuit for a device which is sensitive to the duration of input pulses applied to an input thereof; said input circuit including a current input terminal; a first path extending from said terminal to the input for said device; a second path extending from said terminal and shunting said first path; said second path being inductive and entirely superconductive; said first path including a portion exhibiting resistance; and means for applying input pulses at said current input terminal to cause pulses of predetermined duration only to be applied to the input of said device.

8. A superconductive device comprising first and second circuits having first and second inputs, respectively; said first circuit being connected between said first and second inputs for applying pulses at said second input in response to pulses applied at said first input; said first circuit being maintained at a superconductive temperature; said first circuit including a first path connecting said first and second inputs and a second path shunting said first path; said second path being inductive and entirely superconductive and presenting zero ohmic resistance to each pulse applied at said first input; said first path including at least a portion for presenting a finite ohmic resistance to each pulse applied at said first input.

9. A pulse circuit comprising first and second conductors, means for maintaining said conductors at a superconductive temperature, said first conductor having a higher inductance than that of said second conductor, a resistor serially connected with said second conductor, said first conductor being connected in parallel with the series circuit including said resistor and said second conductor, means for applying a pulse of a given time duration to the parallel circuit formed by said resistor and said first and second conductors and a gate conductor of a material which is superconductive at said temperature disposed adjacent to said second conductor and responsive to current flowing through said second conductor for rendering said gate conductor resistive at said temperature during a portion of said given time duration.

10. A pulse circuit as set forth in claim 9 further including bias means for applying a constant magnetic field to said gate conductor so as to render said gate conductor resistive for only one continuous time interval during said given time duration.

11. A pulse circuit comprising a first inductive path, a second path including a resistive element connected in parallel with said first path, the inductance of said first path being substantially greater than the inductance of said second path, means for applying a pulse of a given time duration to said parallel paths and an element having superconductor properties disposed adjacent said second path at a superconductive temperature, the pulse from said pulse applying means having a magnitude sufficient to render said superconductive element resistive at said temperature for a portion of said given time duration.

12. A pulse circuit for controlling a second circuit comprising a differentiating circuit having first and second parallel paths, said first path being inductive and said second path including a resistor having a resistance value substantially higher than the resistance of said first path, means for applying a pulse during a given time interval to said differentiating circuit and an element coupled to said second circuit capable of being superconductive at a given temperature, said element being disposed adjacent said second path so as to be rendered resistive during a portion of said given time interval.

13. A pulse circuit as set forth in claim 12 wherein said pulse is a constant current pulse.

14. A pulse circuit as set forth in claim 13 wherein said second path further includes a control conductor and said element is disposed adjacent said control conductor.

15. A pulse circuit as set forth in claim 14 wherein said control conductor has a lower inductance value than the inductance of said first path.

16. A pulse circuit as set forth in claim 12 further including a bias circuit for applying a constant magnetic field to said element.

References Cited in the file of this patent

UNITED STATES PATENTS

| | | |
|---|---|---|
| 2,832,897 | Buck | Apr. 29, 1958 |
| 2,913,881 | Garwin | Nov. 24, 1959 |
| 2,930,908 | McKeon et al. | Mar. 29, 1960 |

OTHER REFERENCES

"A Review of Superconductive Switching Circuits," by Slade et al., National Electronics Conference, vol. XIII, pages 574–582, Oct. 7–9, 1959.